US008286171B2

(12) United States Patent
More et al.

(10) Patent No.: US 8,286,171 B2
(45) Date of Patent: Oct. 9, 2012

(54) METHODS AND SYSTEMS TO FINGERPRINT TEXTUAL INFORMATION USING WORD RUNS

(75) Inventors: Scott More, Tokyo (JP); Ilya Beyer, San Mateo, CA (US)

(73) Assignee: Workshare Technology, Inc., San Francisco, CA (US)

( * ) Notice: Subject to any disclaimer, the term of this patent is extended or adjusted under 35 U.S.C. 154(b) by 1114 days.

(21) Appl. No.: 12/177,043

(22) Filed: Jul. 21, 2008

(65) Prior Publication Data

US 2010/0017850 A1    Jan. 21, 2010

(51) Int. Cl.
G06F 9/46    (2006.01)
(52) U.S. Cl. .................. 718/102; 718/103; 707/706
(58) Field of Classification Search .......... 718/102, 718/103
See application file for complete search history.

(56) References Cited

U.S. PATENT DOCUMENTS

| 4,479,195 | A |   | 10/1984 | Herr et al. |
| 4,949,300 | A |   | 8/1990 | Christenson et al. |
| 5,008,853 | A |   | 4/1991 | Bly et al. |
| 5,072,412 | A |   | 12/1991 | Henderson, Jr. et al. |
| 5,220,657 | A |   | 6/1993 | Bly et al. |
| 5,245,553 | A |   | 9/1993 | Tanenbaum |
| 5,247,615 | A |   | 9/1993 | Mori et al. |
| 5,293,619 | A |   | 3/1994 | Dean |
| 5,379,374 | A |   | 1/1995 | Ishizaki et al. |
| 5,446,842 | A |   | 8/1995 | Schaeffer et al. |
| 5,608,872 | A |   | 3/1997 | Schwartz et al. |
| 5,617,539 | A |   | 4/1997 | Ludwig et al. |
| 5,634,062 | A | * | 5/1997 | Shimizu et al. ............... 715/206 |
| 5,671,428 | A |   | 9/1997 | Muranaga et al. |
| RE35,861  | E |   | 7/1998 | Queen |
| 5,787,175 | A |   | 7/1998 | Carter |
| 5,801,702 | A | * | 9/1998 | Dolan et al. .................. 715/854 |
| 5,819,300 | A |   | 10/1998 | Kohno et al. |
| 5,832,494 | A | * | 11/1998 | Egger et al. ............ 707/999.005 |
| 5,890,177 | A |   | 3/1999 | Moody et al. |

(Continued)

FOREIGN PATENT DOCUMENTS

JP    10177650 A    6/1998

(Continued)

OTHER PUBLICATIONS

International Search Report of PCT Application No. PCT/US2009/056651, Dated Apr. 21, 2010, pp. 1-3.

(Continued)

*Primary Examiner* — Evens J Augustin
(74) *Attorney, Agent, or Firm* — Perkins Coie LLP

(57) ABSTRACT

The present invention provides methods and systems to enable fast, efficient, and scalable means for fingerprinting textual information using word runs. The present system receives textual information and provides algorithms to convert the information into representative fingerprints. In one embodiment, the fingerprints are recorded in a repository to maintain a database of an organization's secure data. In another embodiment, textual information entered by a user is verified against the repository of fingerprints to prevent unauthorized disclosure of secure data. This invention provides approaches to allow derivative works (e.g., different ordering of words, substitution of words with synonyms, etc.) of the original information to be detected at the sentence level or even at the paragraph level. This invention also provides means for enhancing storage and resource efficiencies by providing approaches to optimize the number of fingerprints generated for the textual information.

31 Claims, 10 Drawing Sheets

U.S. PATENT DOCUMENTS

| | | | |
|---|---|---|---|
| 5,898,836 A * | 4/1999 | Freivald et al. | 709/218 |
| 6,003,060 A * | 12/1999 | Aznar et al. | 718/103 |
| 6,012,087 A * | 1/2000 | Freivald et al. | 709/218 |
| 6,049,804 A * | 4/2000 | Burgess et al. | 1/1 |
| 6,067,551 A | 5/2000 | Brown et al. | |
| 6,088,702 A | 7/2000 | Plantz et al. | |
| 6,145,084 A | 11/2000 | Zuili et al. | |
| 6,189,019 B1 * | 2/2001 | Blumer et al. | 715/205 |
| 6,212,534 B1 | 4/2001 | Lo et al. | |
| 6,219,818 B1 * | 4/2001 | Freivald et al. | 714/799 |
| 6,243,091 B1 * | 6/2001 | Berstis | 715/839 |
| 6,263,350 B1 * | 7/2001 | Wollrath et al. | 1/1 |
| 6,263,364 B1 * | 7/2001 | Najork et al. | 709/217 |
| 6,269,370 B1 * | 7/2001 | Kirsch | 1/1 |
| 6,285,999 B1 * | 9/2001 | Page | 1/1 |
| 6,301,368 B1 | 10/2001 | Bolle et al. | |
| 6,321,265 B1 * | 11/2001 | Najork et al. | 709/224 |
| 6,336,123 B2 * | 1/2002 | Inoue et al. | 715/206 |
| 6,351,755 B1 * | 2/2002 | Najork et al. | 715/206 |
| 6,377,984 B1 * | 4/2002 | Najork et al. | 709/217 |
| 6,404,446 B1 * | 6/2002 | Bates et al. | 715/854 |
| 6,418,433 B1 * | 7/2002 | Chakrabarti et al. | 1/1 |
| 6,418,453 B1 * | 7/2002 | Kraft et al. | 1/1 |
| 6,424,966 B1 * | 7/2002 | Meyerzon et al. | 707/610 |
| 6,449,624 B1 | 9/2002 | Hammack et al. | |
| 6,513,050 B1 | 1/2003 | Williams et al. | |
| 6,547,829 B1 * | 4/2003 | Meyerzon et al. | 715/234 |
| 6,560,620 B1 | 5/2003 | Ching | |
| 6,584,466 B1 | 6/2003 | Serbinis et al. | |
| 6,594,662 B1 * | 7/2003 | Sieffert et al. | 1/1 |
| 6,614,789 B1 | 9/2003 | Yazdani et al. | |
| 6,658,626 B1 | 12/2003 | Aiken | |
| 7,035,427 B2 | 4/2006 | Rhoads | |
| 7,107,518 B2 | 9/2006 | Ramaley et al. | |
| 7,152,019 B2 | 12/2006 | Tarantola et al. | |
| 7,212,955 B2 | 5/2007 | Kirshenbaum et al. | |
| 7,240,207 B2 | 7/2007 | Weare | |
| 7,299,504 B1 | 11/2007 | Tiller et al. | |
| 7,356,704 B2 | 4/2008 | Rinkevich et al. | |
| 7,496,841 B2 | 2/2009 | Hadfield et al. | |
| 7,624,447 B1 | 11/2009 | Horowitz et al. | |
| 7,627,613 B1 * | 12/2009 | Dulitz et al. | 1/1 |
| 7,680,785 B2 * | 3/2010 | Najork | 707/999.005 |
| 7,694,336 B2 | 4/2010 | Rinkevich et al. | |
| 7,857,201 B2 * | 12/2010 | Silverbrook et al. | 235/375 |
| 7,877,790 B2 | 1/2011 | Vishik et al. | |
| 7,890,752 B2 | 2/2011 | Bardsley et al. | |
| 8,042,112 B1 * | 10/2011 | Zhu et al. | 718/102 |
| 2002/0010682 A1 * | 1/2002 | Johnson | 705/59 |
| 2002/0019827 A1 | 2/2002 | Shiman et al. | |
| 2002/0023158 A1 * | 2/2002 | Polizzi et al. | 709/227 |
| 2002/0052928 A1 * | 5/2002 | Stern et al. | 709/218 |
| 2002/0063154 A1 | 5/2002 | Hoyos et al. | |
| 2002/0065827 A1 * | 5/2002 | Christie et al. | 707/10 |
| 2002/0065848 A1 | 5/2002 | Walker et al. | |
| 2002/0073188 A1 * | 6/2002 | Rawson, III | 709/223 |
| 2002/0087515 A1 * | 7/2002 | Swannack et al. | 707/2 |
| 2002/0099602 A1 * | 7/2002 | Moskowitz et al. | 705/14 |
| 2002/0129062 A1 * | 9/2002 | Luparello | 707/513 |
| 2002/0136222 A1 | 9/2002 | Robohm | |
| 2002/0138744 A1 | 9/2002 | Schleicher et al. | |
| 2002/0159239 A1 | 10/2002 | Amie et al. | |
| 2002/0164058 A1 | 11/2002 | Aggarwal et al. | |
| 2003/0037010 A1 | 2/2003 | Schmelzer | |
| 2003/0061260 A1 * | 3/2003 | Rajkumar | 709/104 |
| 2003/0131005 A1 * | 7/2003 | Berry | 707/10 |
| 2003/0158839 A1 * | 8/2003 | Faybishenko et al. | 707/3 |
| 2006/0005247 A1 | 1/2006 | Zhang et al. | |
| 2006/0021031 A1 | 1/2006 | Leahy et al. | |
| 2006/0059196 A1 | 3/2006 | Sato et al. | |
| 2006/0064717 A1 | 3/2006 | Shibata et al. | |
| 2006/0112120 A1 | 5/2006 | Rohall | |
| 2006/0271947 A1 | 11/2006 | Lienhart et al. | |
| 2007/0005589 A1 | 1/2007 | Gollapudi | |
| 2007/0025265 A1 | 2/2007 | Porras et al. | |
| 2007/0101154 A1 | 5/2007 | Bardsley et al. | |
| 2007/0101413 A1 | 5/2007 | Vishik et al. | |
| 2007/0294612 A1 | 12/2007 | Drucker et al. | |
| 2008/0033913 A1 | 2/2008 | Winburn | |
| 2008/0080515 A1 | 4/2008 | Tombroff et al. | |
| 2008/0219495 A1 | 9/2008 | Hulten et al. | |
| 2009/0034804 A1 | 2/2009 | Cho et al. | |
| 2009/0064326 A1 | 3/2009 | Goldstein | |
| 2009/0129002 A1 | 5/2009 | Wu et al. | |
| 2009/0241187 A1 | 9/2009 | Troyansky | |
| 2010/0064372 A1 | 3/2010 | More et al. | |
| 2010/0070448 A1 * | 3/2010 | Omoigui | 706/47 |
| 2010/0299727 A1 | 11/2010 | More et al. | |

FOREIGN PATENT DOCUMENTS

| | | | |
|---|---|---|---|
| JP | 2004265267 A | | 9/2004 |
| JP | 2007299364 A | | 11/2007 |
| KR | 1020010078840 | | 8/2001 |
| KR | 20040047413 A | | 6/2004 |
| KR | 1020060048686 | | 5/2006 |
| KR | 200070049518 A | | 5/2007 |
| KR | 1020080029602 | | 4/2008 |
| WO | WO-0060504 A1 | | 10/2000 |

OTHER PUBLICATIONS

Written Opinion PCT Application No. PCT/US2009/056651, Dated Apr. 21, 2010, pp. 1-5.

Co-pending U.S. Appl. No. 12/844,818, filed Jul. 27, 2010.

Final Office Action Mailed Apr. 17, 2007 for U.S. Appl. No. 10/023,010, filed Dec. 17, 2001, Issued Patent No. 7,496,841.

Final Office Action Mailed Aug. 12, 2011 for U.S. Appl. No. 12/209,096, filed Sep. 11, 2008.

International Search Report of PCT Application No. PCT/US2010/043345, Apr. 28, 2011, 3 pages.

Non-Final Office Action Mailed Dec. 22, 2011 in Co-Pending U.S. Appl. No. 12/209,082.

Non-Final Office Action Mailed Mar. 11, 2011, in Co-pending U.S. Appl. No. 12/209,096, filed Sep. 11, 2008.

Non-Final Office Action Mailed Mar. 16, 2006 for U.S. Appl. No. 10/023,010, filed Dec. 17, 2001, Issued Patent No. 7,496,841.

Restriction Requirement Mailed Feb. 14, 2005 for U.S. Appl. No. 10/023,010, filed Dec. 17, 2001, Issued Patent No. 7,496,841.

Restriction Requirement Mailed Feb. 5, 2008 for U.S. Appl. No. 10/023,010, filed Dec. 17, 2001, Issued Patent No. 7,496,841.

Restriction Requirement Mailed Jun. 30, 2006 for U.S. Appl. No. 10/136,733, filed Apr. 30, 2002.

PC Magazine "Pure Intranets: Real-Time Internet Collaboration", http://www.zdnet.com/pcmag/featuresgroupware/gpwst.htm, Aug. 30, 2001, 2 pages.

Wells et al., "Groupware & Collaboration Support", www.objs.com/survey/groupwar.htm, Aug. 30, 2001, 10 pages.

Tsai, et al., "A Document Workspace for Collaboration and Annotation based on XML Technology", IEEE, 2000, pp. 165-172.

Roussev, et al., "Integrating XML and Object-based Programming for Distributed Collaboration", IEEE, 2000, pp. 254-259.

XP-002257904, "Workshare Debuts Synergy", 2003, 3 pages.

Microsoft, "Microsoft XP, Product Guide", pp. 1-26.

International Search Report of PCT Application No. PCT/IB2002/005821, Jan. 30, 2004, 6 pages.

International Search Report of PCT Application No. PCT/US2009/051313, Mar. 3, 2010, 3 pages.

Written Opinion of PCT Application No. PCT/US2009/051313, Mar. 3, 2010, 4 pages.

Co-pending U.S. Appl. No. 10/136,733, filed Apr. 30, 2002.

Co-pending U.S. Appl. No. 10/023,010, filed Dec. 17, 2001.

Co-pending U.S. Appl. No. 12/209,096, filed Sep. 11, 2008.

Co-pending U.S. Appl. No. 12/275,185, filed Nov. 20, 2008.

Co-pending U.S. Appl. No. 12/621,429, filed Nov. 18, 2009.

Co-pending U.S. Appl. No. 12/209,082, filed Sep. 11, 2008.

Non-Final Office Action Mailed Mar. 20, 2006 in Co-pending U.S. Appl. No. 10/136,733, filed Apr. 30, 2002.

Notice of Allowance Mailed Oct. 24, 2008 in Co-pending U.S. Appl. No. 10/023,010, filed Dec. 17, 2001.

Non-Final Office Action Mailed May 7, 2008 in Co-pending U.S. Appl. No. 10/023,010, filed Dec. 17, 2001.
International Search Report of PCT Application No. PCT/US2009/056668 dated Apr. 16, 2010, pp. 1-9.
Written Opinion PCT Application No. PCT/US2009/056668 dated Apr. 16, 2010, pp. 1-4.
Weiss et al., Lightweight document matching for help-desk applications, In: Intelligent Systems and their Applications, IEEE, Vo. 15, Issue:2, pp. 57-61, ISSN 1094-7167, 2000.
International Search Report of PCT Application No. PCT/US2009/065019 dated Jun. 4, 2010, pp. 1-6.
Written Opinion PCT Application No. PCT/US2009/065019 dated Jun. 4, 2010, pp. 1-5.
International Search Report of PCT Application No. PCT/US2009/064919 dated Jul. 1, 2010, pp. 1-3.
Written Opinion PCT Application No. PCT/US2009/064919 dated Jul. 1, 2010, pp. 1-4.

* cited by examiner

METHODS AND SYSTEMS TO FINGERPRINT TEXTUAL INFORMATION USING WORD RUNS

FIELD OF INVENTION

The present invention relates to information security and more specifically relates to systems and methods for detecting and preventing unauthorized disclosure of secure information. Furthermore, the present invention pertains to fingerprinting textual information using word runs for the purpose of detecting and preventing unauthorized disclosure of secure information.

BACKGROUND OF THE INVENTION

With the rapid increase and advances in digital documentation capabilities and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information (or derivatives thereof) from being disclosed beyond the perimeters of the organization.

Additionally, the organizations face the challenge of categorizing and maintaining the large corpus of digital information across potentially thousands of data stores, content management systems, end-user desktops, etc. It is therefore valuable to the organization to be able to identify and disregard redundant information from this vast database. At the same time, it is critical to the organization's security to be able to identify derivative forms of the secure data (e.g., changes to the sentence structure or word ordering at the sentence/paragraph level, use of comparable words in the form of synonyms/hpernyms, varied usage of punctuations, etc.) and identify any unauthorized disclosure of even such derivative forms. Therefore, any system or method built to accomplish the task of preventing unauthorized disclosure would have to address these two conflicting challenges.

One method to detect similar data is by examining the database at the file level. This can be done by comparing the file names, or by comparing the file sizes, or by doing a checksum of the contents of the file. However, even minor differences between the two files will evade a detection method.

Other prior art solutions teach partial text matching methods using various k-gram approaches. In such approaches, text-characters of a fixed length, called k-grams, are selected from the secure text. These k-grams are hashed into a number called a fingerprint. In order to increase storage and resource efficiency, the various prior art approaches propose different means by which the k-grams can sampled, so as to store only a representative subset of the k-grams. However, these prior art approaches suffer a number of disadvantages. For example, these prior systems are not robust against derivate works of the secure text. Additionally, the k-gram approaches are not suitable for use in multi-language environments (e.g., a document containing a mixture of Mandarin and English words). Also, using a character-based approach as opposed to a word-based approach does not allow for the exclusion of common or repeated words, thus resulting in overall memory and resource inefficiencies.

SUMMARY OF THE INVENTION

Methods and systems to provide fast, efficient, and scalable means to fingerprint textual information using word runs is presented. In one embodiment, the present invention provides methods and systems to efficiently fingerprint vast amounts textual information using word runs and allows these fingerprints to be recorded in a repository. This embodiment comprises a receiving module to receive textual information from a plurality of input sources. It further includes a normalization module to convert the textual information to a standardized canonical format. It then includes a word boundary detection module that detects the boundaries of words in a language independent manner. It additionally includes a word hash list generator, where each word of the textual information is converted to a representative hash value. Several means are provided by which the word hash list can be post-processed to significantly improve memory and resource efficiencies. Examples of such post-processing include eliminating certain stop words, grouping certain categories of words and mapping them to one hash value, etc. This embodiment also includes a fingerprint generator, which generates fingerprints by applying hash functions over the elements of the word hash list. The fingerprint generator uses algorithms to generate only a representative subset of the entire word hash list, thus further enhancing the memory and resource efficiencies of the system. A repository, which can include any database or storage medium, is then used to record the fingerprints generated for the vast amounts of textual information received at the receiver module.

In another embodiment, the present invention provides methods and systems to receive any textual information entered in by a user and to match such information against a fingerprint database. This embodiment includes a receiving module to receive the user entered information, a normalization module to convert the textual information to a standardized canonical format, a language independent word boundary detector to detect the start and end of each word, a word hash list generator to generate representative hash values to every word, and a fingerprint generator that uses a sliding window to efficiently generate a representative subset of fingerprints for the received user information. This embodiment finally matches the generated fingerprints against a previously developed fingerprint database, and provides alerts to the user in the event that any secure or protected information is indeed being disclosed.

Other embodiments of the present invention allow the fingerprints to be generated without any dependence on human languages, and without any linguistic understanding of the underlying text, thereby allowing the invention to be applied to most languages. The present invention also provides embodiments where the fingerprints are made independent of presence of punctuations, ordering of words within sentences or paragraphs, and/or presence of upper and lower case characters in the words. By doing this, the present invention allows word runs to be matched and detected both at sentence and paragraph level. Additionally, this invention allows even derivative works of the original text (e.g., changes to the sentence structure or word ordering at the sentence/paragraph level, use of comparable words in the form of synonyms/hpernyms, varied usage of punctuations, removal or addition of certain stop words, etc.) to be matched and detected.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
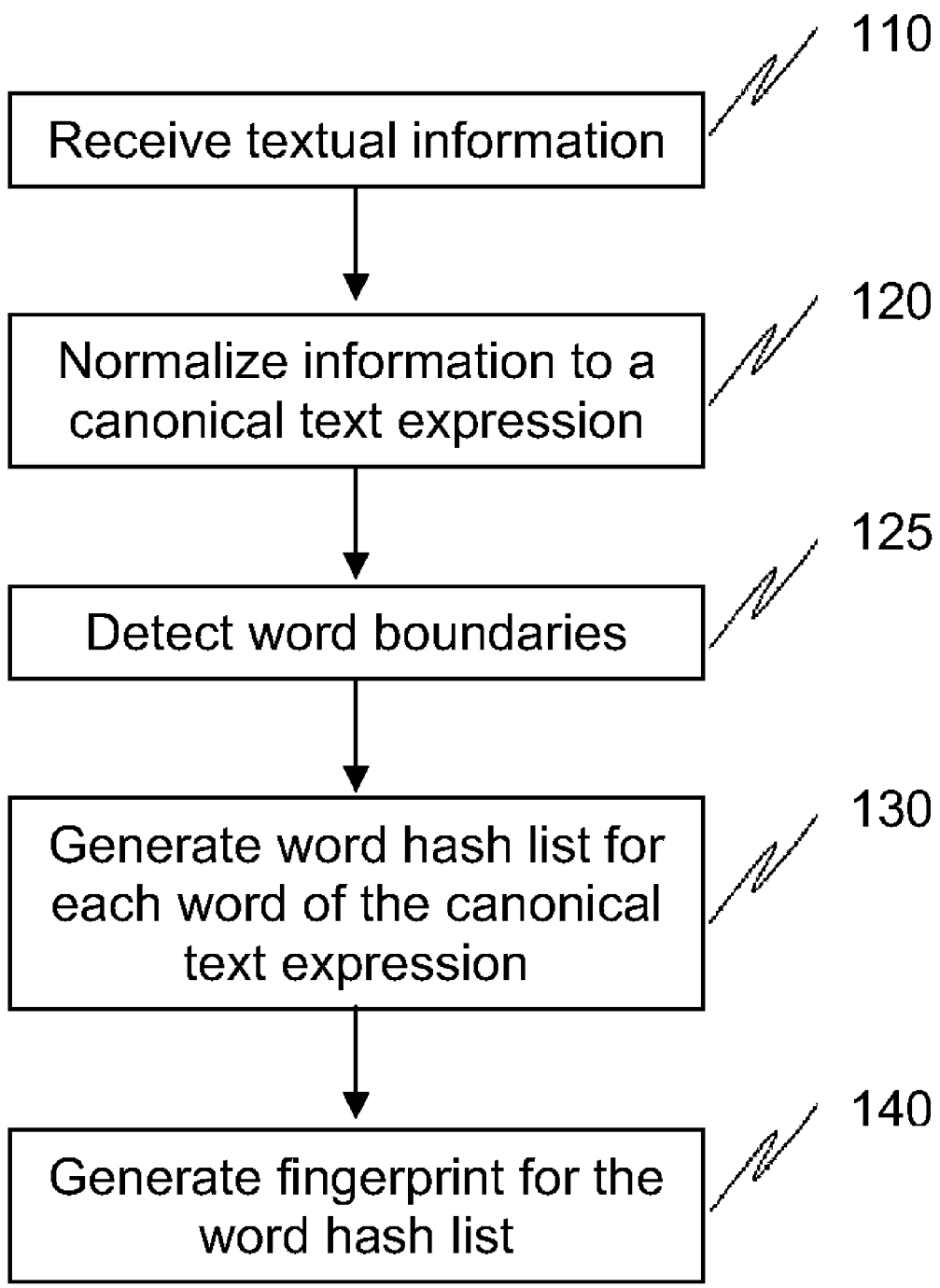
FIG. 1 illustrates an overall embodiment of a method for fingerprinting textual information using word runs.

FIG. 1 shows one embodiment of an overall method to fingerprint textual information using word runs. In this embodiment, the information that needs to be fingerprinted is received from a plurality of sources 110. This information is then normalized 120 to a standardized or canonical text format. The boundaries of each word are then detected 125 in a language independent manner. The words from the normalized text are then used to generate a word run based hash list, called the word hash list 130. This word hash list is then used to generate the final fingerprints 140. Each of these steps are discussed in detail below.

Information may be received from several sources. In one embodiment, the source could include confidential, important, or secure information maintained by an organization, where such information needs to be recorded or registered into a database. In another embodiment, the source could include any information entered by a user having access to an organization's secure information, where such information would need to be matched and inspected against an existing database of secure information. The textual information received from either of these sources includes a plurality of words. Such words are may be present as a plurality of text-characters, with one word distinguished from another by the presence of at least one space-character. The words may also be present as plurality of text-characters, with one word separated from another by the use of punctuation marks.

The received information is first normalized to a canonical text representation 120. This can be done by converting the computer files containing the textual information into one of several raw text formats. One example of such normalization is to convert a PDF (Portable Document Format) file into a Unicode transformation format file. An example of a Unicode transformation format is UTF-16.

In one embodiment, the present invention uses a word boundary detector 125 to detect the separation of one word from a preceding or following word. The word boundary detector 125 uses a state machine and employs character-classes that dictate boundary analysis across languages. In this embodiment, the state machine utilizes mapping tables to determine what character-class a particular character belongs to. By mapping the current character and comparing that against the mapping of the previous character, the detector determines whether a word has just started or ended. Because the character-classes include generic word separators or delimiters common to most languages, this word boundary detector can be used in a language independent manner. Additionally, the characters within the words may be case-folded, such that the word-value hash assigned to a particular word does not depend upon whether the word has any upper or lower case characters. Note that the case folding can be done at any time prior to the generation of a word hash list.

Figure 2:
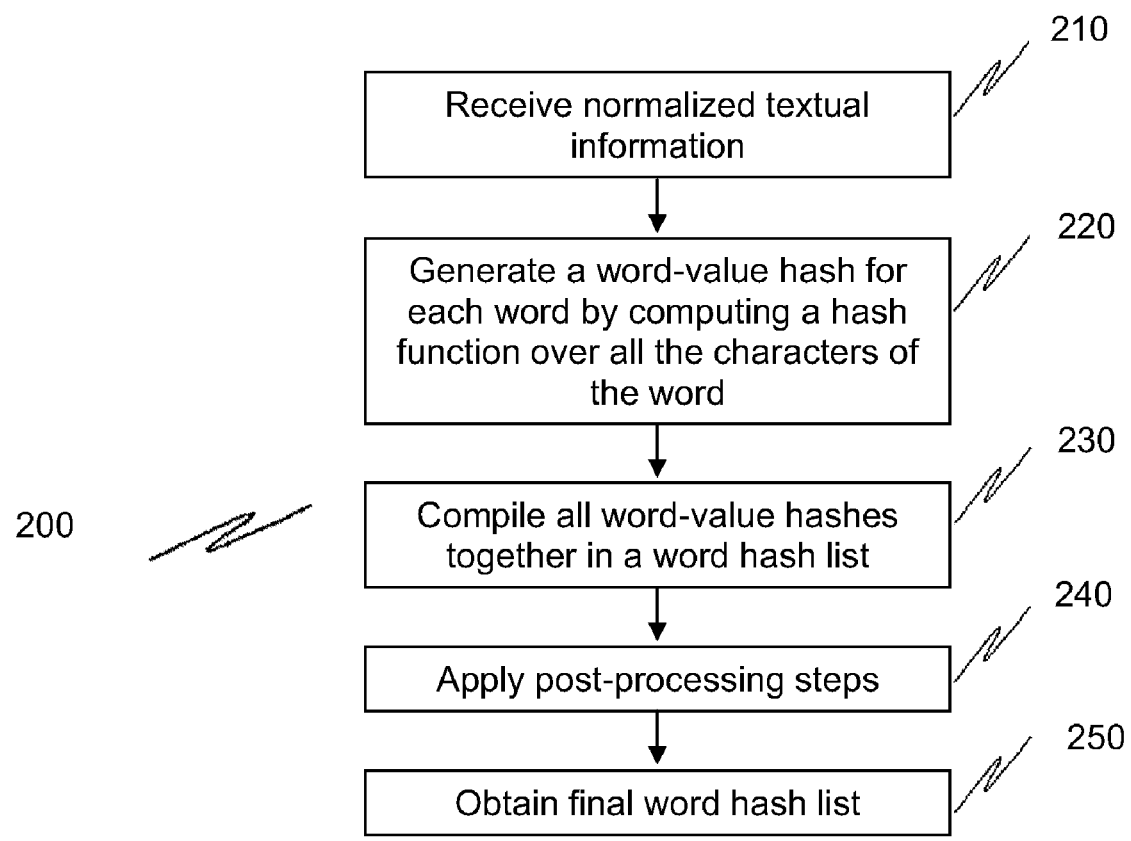
FIG. 2 is a flowchart depicting an embodiment of a method for generating a word hash list.

FIG. 2 depicts one method of generating a word hash list 200. Here, the normalized textual information is read in as input 210. Each of the words present in this normalized input is then converted to a word-value hash 220. One example of generating a word-value hash is to compute a hash based function over every character of a word and generating an integer value corresponding to that word. Such word-value hashes are generated for every word of the received normalized information. In this embodiment, only words are processed, and punctuations are not assigned any word-value hashes. This allows the method to remain impervious to changes in punctuation. The resulting word-value hashes from all the words are compiled together to obtain a word hash list 230. This word hash list may then be subject to post-processing steps 240 (explained below in detail in FIG. 3) to generate fingerprints that are robust and remain impervious to edits in derivative works of the original text. The word hash list received after such post-processing steps is designated as the final word hash list 250.

In one embodiment, the word-value hashes are computed as 32-bit unsigned integers. This is advantageous because the computation of the word-value hashes could then use 32-bit arithmetic, which would be much faster than performing 64-bit arithmetic on 32-bit architectures.

Figure 3:
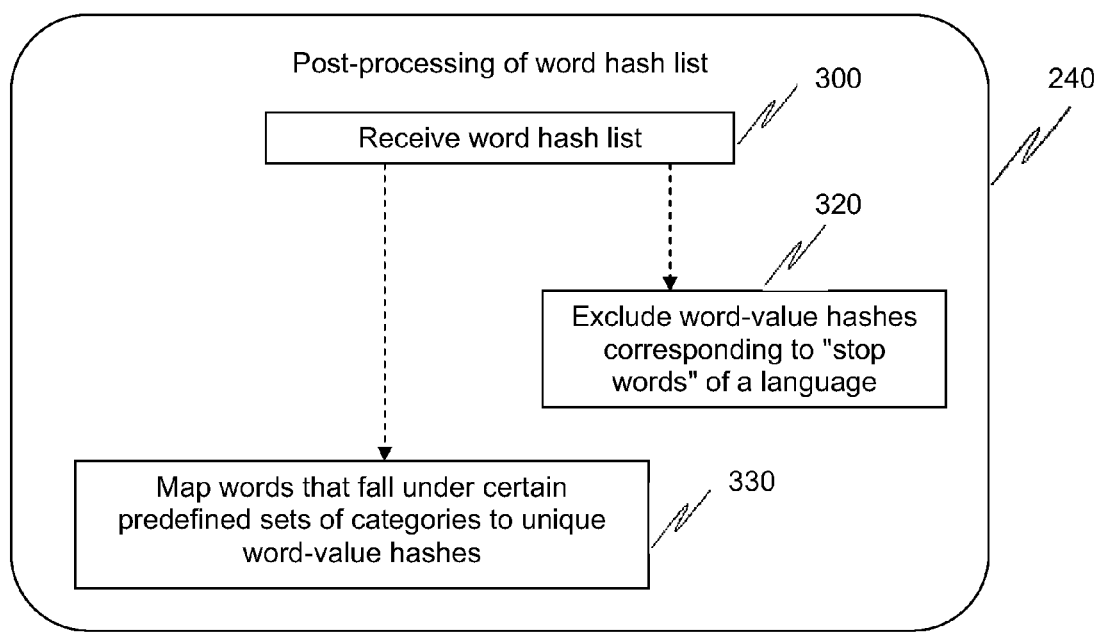
FIG. 3 is a block diagram providing the various methods by which post processing can be performed on the word hash list to improve efficiency.

FIG. 3 is a block diagram 240 providing information on various methods to achieve post processing of the word hash lists. In one method, word-value hashes corresponding to certain stop-words are excluded 320 from the final word hash list. Stop-words include those words of any language that occur frequently in the usage of the language, but do not add any substantive content to meaningful understanding of the language. Examples of stop-words include prepositions (e.g., beside, to, until), gender denoting terms (e.g., she, he, her), etc. In yet another method, certain predefined sets of words are mapped to a distinct word-value hash 330. Examples include mapping all stems of a frequently used word to the same root, mapping nouns to common synonyms or hypernyms, etc. In one embodiment, the word-value hashes 220 are generated as integers such that words of the textual information are represented by unique integer values. Operating the post processing steps with integer values results in increased computational efficiencies as compared to operating on character or string values.

The post processing steps of FIG. 3 ensure that the final fingerprints remain robust and impervious to any changes or edits in derivative works of the original information. Specifically, these steps allow even derivative works of the original work to be matched and detected at a later inspection stage. Derivative works of the original information may include changes in word ordering, removal or addition of stop-words, changes in punctuations, and usage of different stems for a particular word. Additionally, the post-processing steps also improve the efficiency of the process by reducing the number of word-value hashes that will need further processing.

Figure 4:
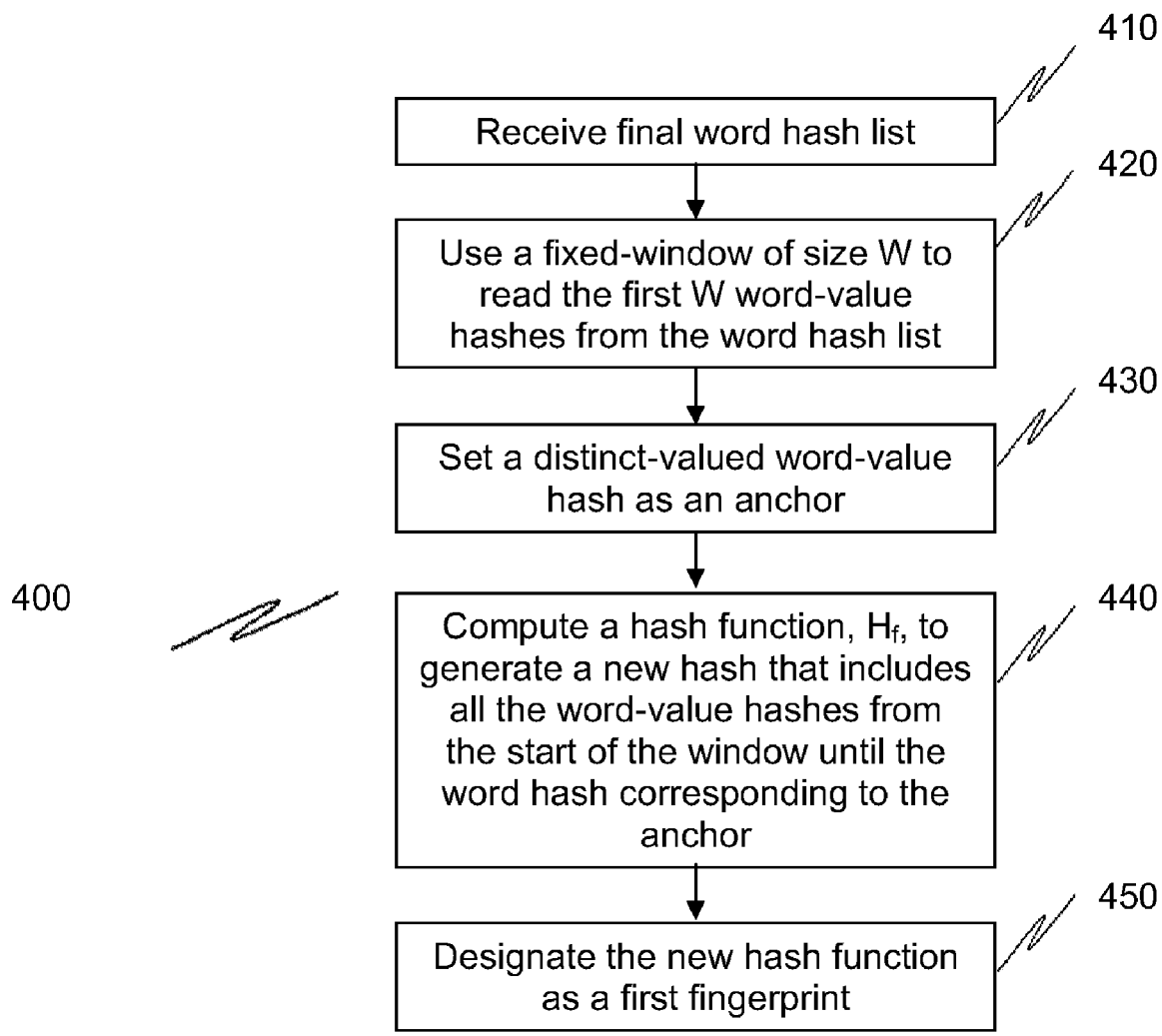
FIG. 4 is a flowchart depicting a preferred embodiment of a method to generate a first fingerprint for the received textual information.

FIG. 4 is a flowchart 400 depicting a method of generating one fingerprint from the final word hash list 250. The method comprises receiving the final word hash list 410 and assigning a sliding window of fixed-size W (where W is an integer greater than or equal to 1) to read the first W word-value hashes from the word hash list 420. An anchor 430 is then determined for this first window, by selecting a distinct-valued word-value hash from the W number of word-value hashes currently read in by the sliding window. Examples of distinct-valued word-value hashes include those word-value hashes that have the highest integer value, or those word-value hashes with the lowest integer value. After selecting an anchor, a new hash $H_f$ 440 is computed by applying a hash function over all the words starting from the first word-value hash within the window, up until the word-value hash that is designated as the anchor. This new hash is effectively a hash of one or more word-value hashes, and this new hash is designated as the first fingerprint.

Figure 5:
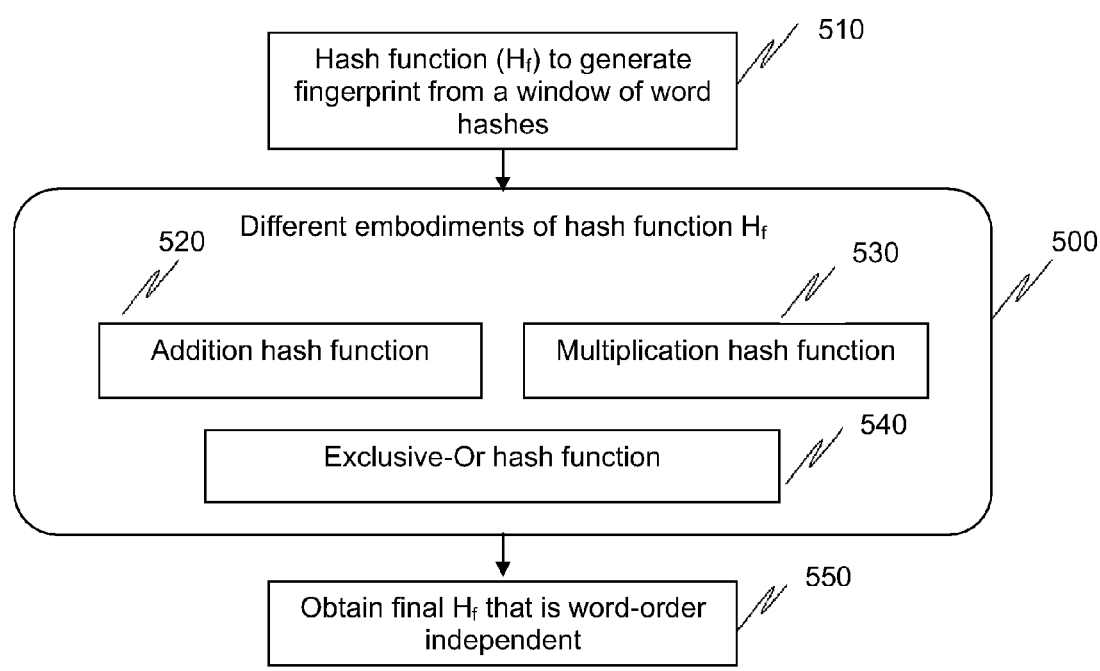
FIG. 5 is a block diagram providing examples of methods by which the fingerprints can be made word-order independent.

The present invention also discloses methods by which the hash function can optionally be made word-order independent. FIG. 5 is a block diagram illustrating several possible embodiments of the hash function $H_f$. These embodiments represent different ways by which $H_f$ can be made word order independent 500. In one embodiment, $H_f$ can be implemented as an addition hash function 520. In another embodiment, $H_f$ can be implemented as a multiplication hash function 530. In yet another embodiment, $H_f$ can be implemented as an exclusive-or hash function 540. These hash functions are examples of symmetric hash functions, and would therefore allow the fingerprints to be word order independent. To make $H_f$ more robust, another embodiment of $H_f$ can be developed by combining the symmetric hash functions 540. One method of realizing such an embodiment would be by splitting a large word-value hash into two parts and performing a different symmetric operation on the two parts. Word-order independence of $H_f$ allows for a much larger range of modifications to the original text to be detected at the inspection level, than is possible with prior art approaches. The combination of this word-order independence 500 and the various post-processing methods 300 disclosed in FIG. 3 makes it possible to detect similar text at the inspection stage, even when such text is modified from the original text at the sentence or paragraph level.

Figure 6:
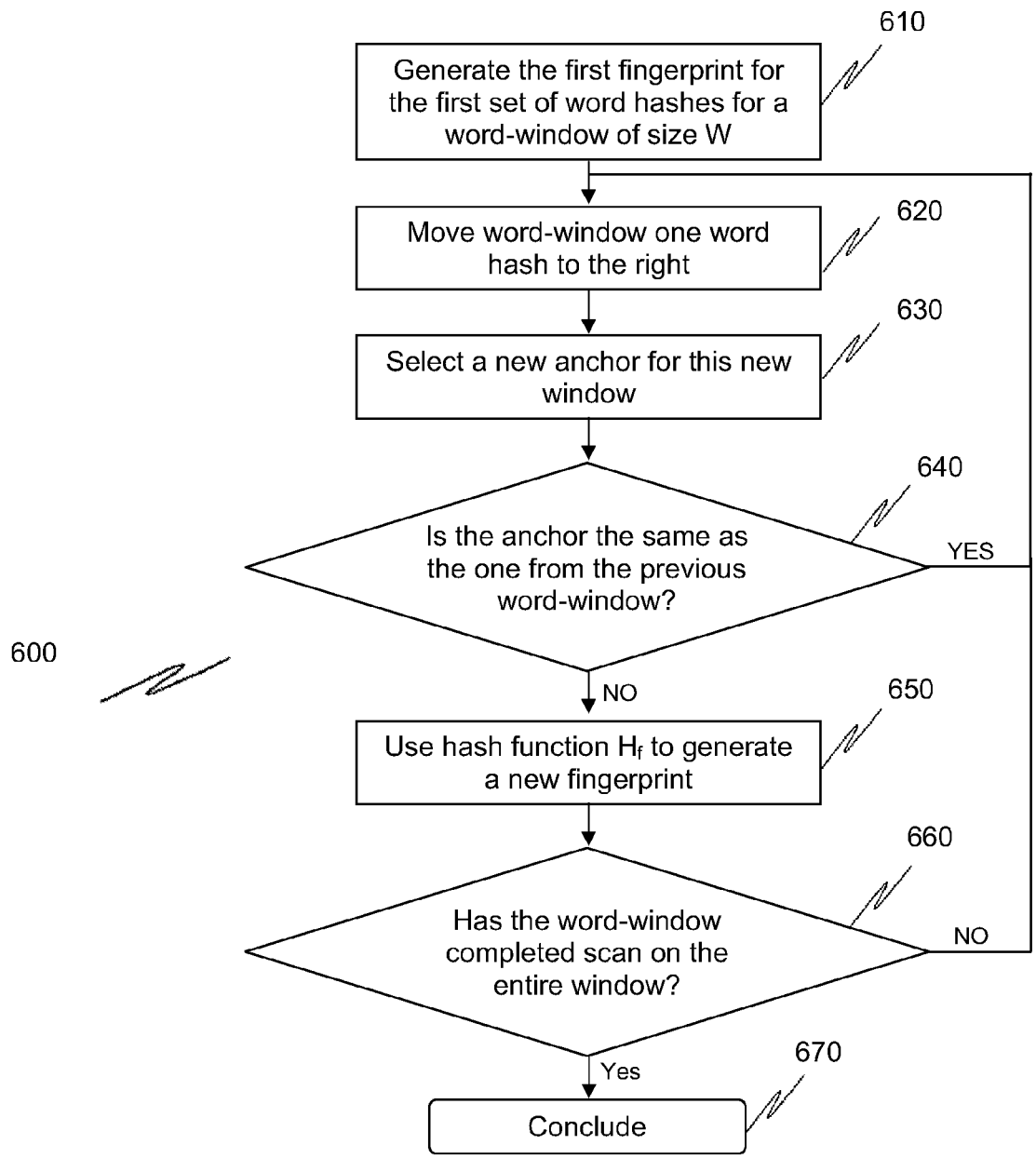
FIG. 6 is a flowchart depicting a preferred embodiment of a method to generate a set of fingerprints for the entire textual information.

FIG. 6 is a flowchart illustrating one method for generating a complete set of fingerprints 600 for the entire word hash list 250. In one embodiment, a first fingerprint 450 is generated using the method explained previously in FIG. 4. After this, the sliding window of size W 420 is moved one position to the right 620, thereby reading W word-value hashes 220 starting from the second word-value hash in the word hash list 250. From this new set of W word-value hashes, a new anchor 630 is designated for this new window by selecting a new distinct-valued word-value hash, similar to the anchor selection method 430 for the first fingerprint as explained in FIG. 4. This new anchor 630 is then compared against the anchor that was generated for the immediately preceding window. If the new anchor 630 is identical to the immediately preceding anchor, no new fingerprint is generated 640. However, if the new anchor 630 is not identical to the immediately preceding anchor, a new fingerprint is generated 650 using the hash function $H_f$ 440 explained in FIG. 4. After the completion of this step, the sliding window is moved another position to the right, reading a new set of W word-value hashes. This process is repeated until all the word-value hashes in the word hash list are completely scanned by the sliding window.

Figure 7:
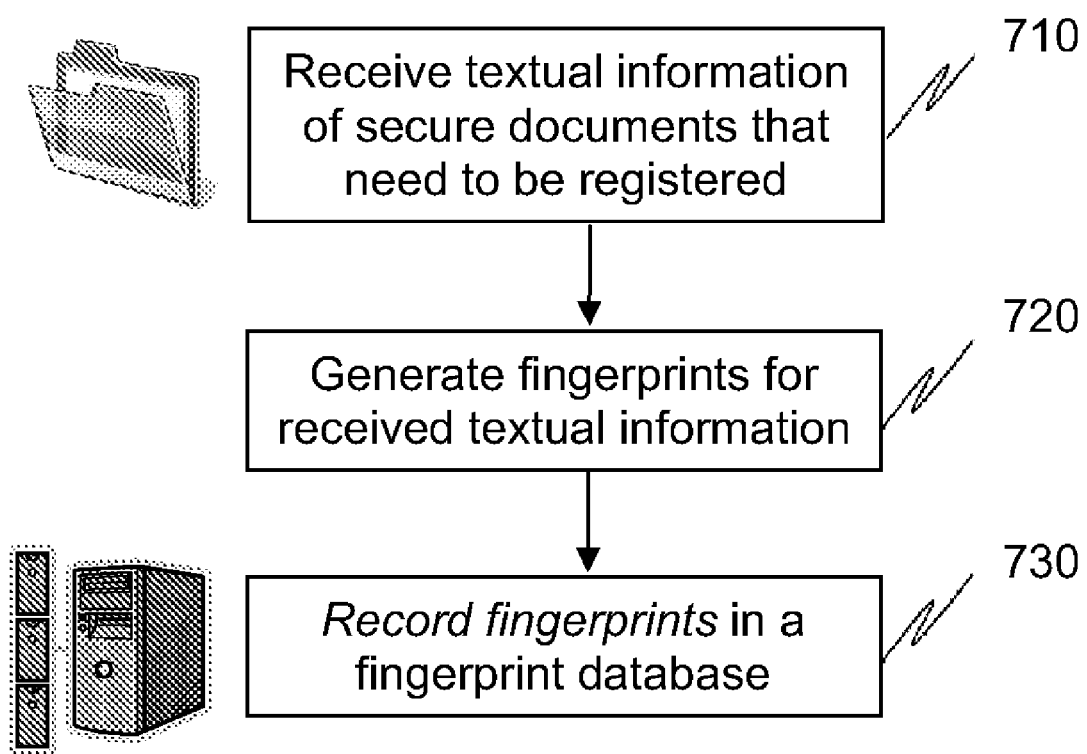
FIG. 7 illustrates an embodiment for generating the fingerprints for secure and protected information of an organization and then recording the fingerprints in a repository.

FIG. 7 presents one embodiment of registering the fingerprints. In this embodiment, the fingerprints generated for each word hash list 250 using the methods explained in FIGS. 2-6 are stored in a repository 700. This repository would then serve as a database 730, containing fingerprint data for all confidential, important, or secure information of an organization.

Figure 8:
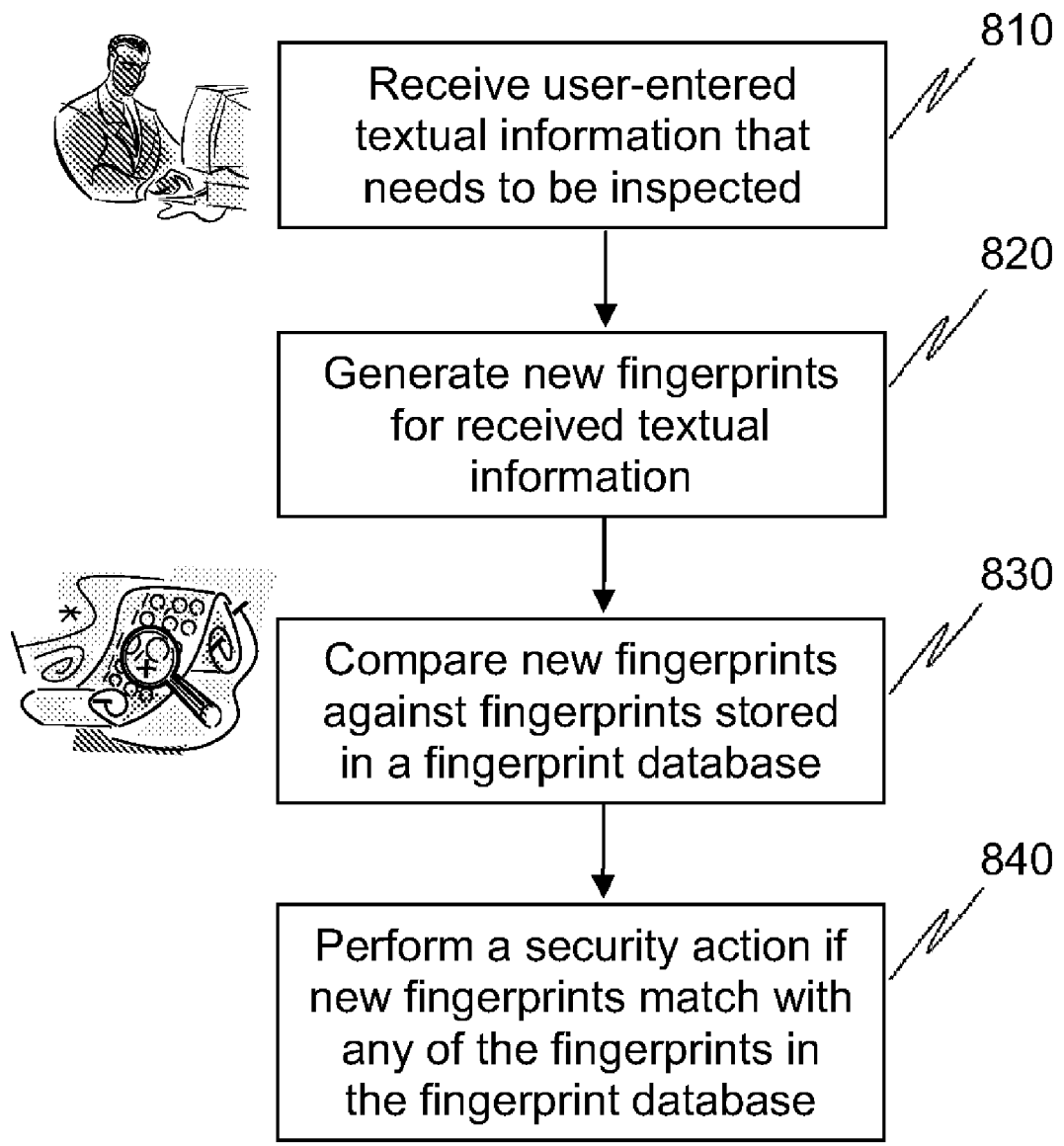
FIG. 8 illustrates an embodiment for generating the fingerprints for user-entered information and then matching that fingerprint against fingerprints stored in a repository.

FIG. 8 depicts another embodiment of generating fingerprints, where the embodiment can be used for the purpose of inspecting any user entered information. This can be done by matching the fingerprint generated for the user-entered information 820 against fingerprints stored in a central fingerprint database 830. This central fingerprint database contains a plurality of fingerprints of an organization's secure information, as explained in FIG. 7. A new set of fingerprints is then generated for text that a user desires to transmit outside of the organization 810. Examples of such transmitted text includes text contained in an email that a user desires to send out from his computer, text contained in any files that a user attaches to an email, text contained in any files that a user transfers outside of his computer using any of the computer's output devices, etc. Examples of a computer's output devices include data transferred to a floppy disc in a floppy drive, data transferred to a flash memory device, data transferred to a disc in a CD/DVD drive, data transferred to another computer using the computer's network connectivity, data transferred over the internet using a file transfer protocol, etc. Here, the new set of fingerprints is compared against the fingerprints stored in the central fingerprint database 830. In one embodiment, a security action is performed if any of the new set of fingerprints match against any of the fingerprints in the central database. Examples of such security actions include sending out an email alert to a person responsible for the organization's information security, denying the user's access to the information, logging the event as a potential security violation, requiring the user to enter a password to allow such information to be transferred, preventing the secure information from being transferred out, etc.

Figure 9:
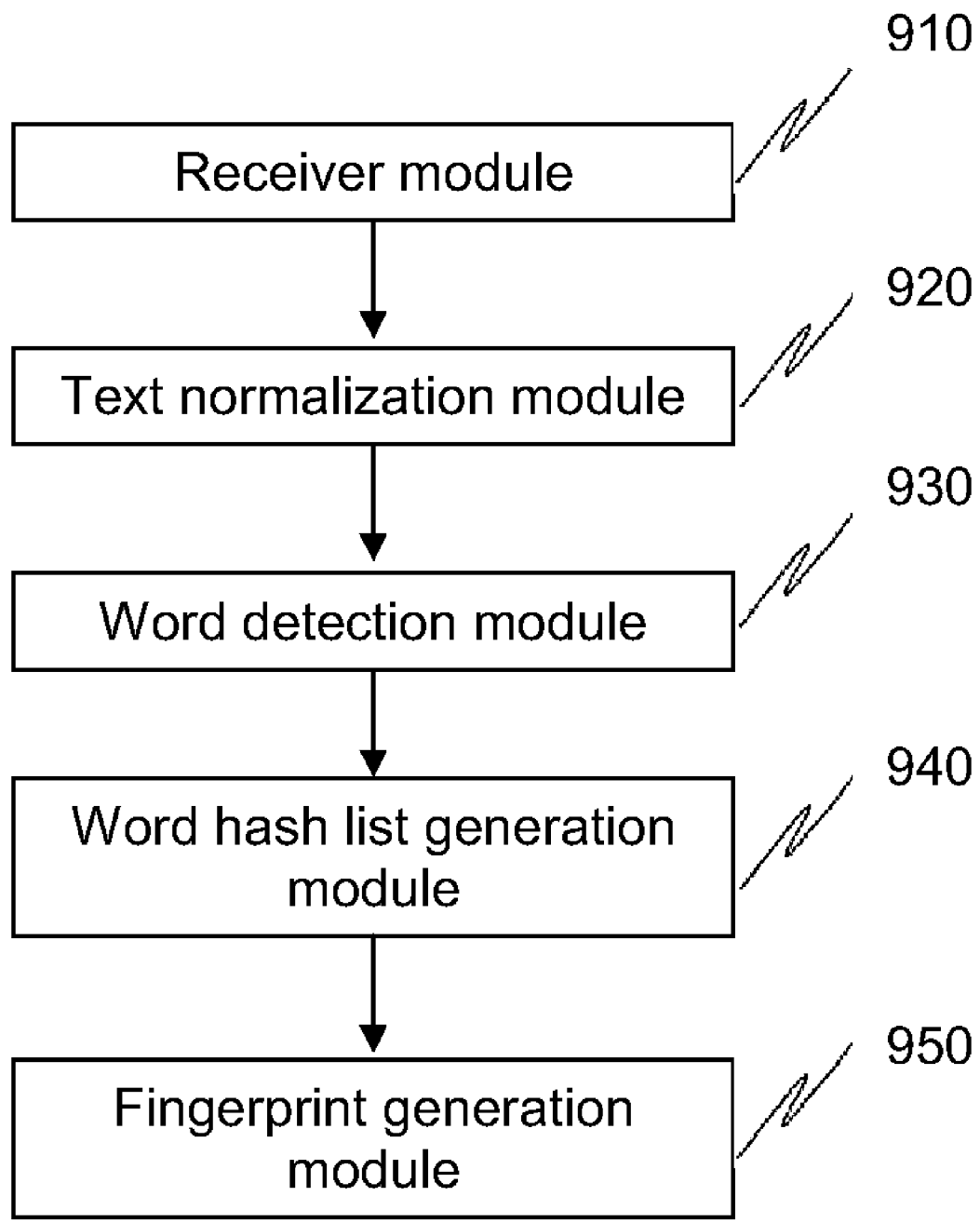
FIG. 9 provides an overall embodiment of a system for fingerprinting textual information using word runs.
Figure 10:
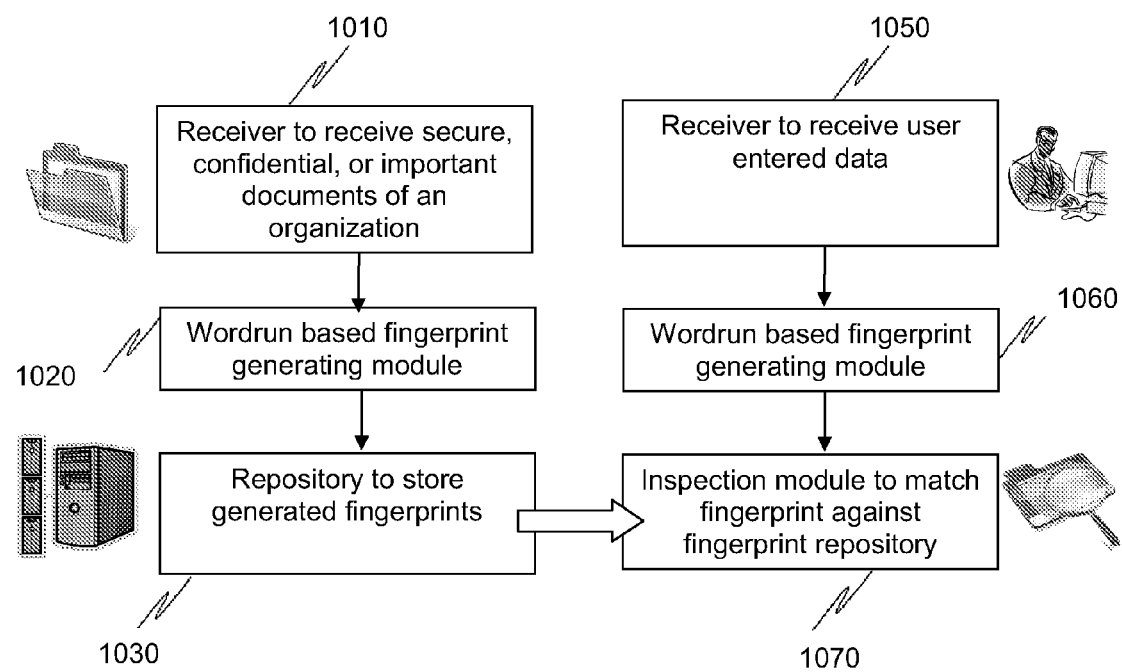
FIG. 10 is a block diagram depicting various embodiments of systems by which fingerprints can be either recorded or used for matching and detecting an unauthorized disclosure.

The following description of FIGS. 9-11 includes an overview of computer hardware and other operating components suitable for implementing the systems of the invention described here. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 9 shows one embodiment of an overall system that can be used to generate fingerprints for wordruns. Here, the system has a first receiver module 910. In this embodiment, the receiver module 910 is a computer, which can receive textual information from several sources. In one embodiment, the textual information can be entered into the computer by a user, using any I/O device attached to the computer. Such I/O devices could include any device used for entering information into a computer, including a keyboard, pointing device (e.g., a mouse), microphone, joystick, game pad, scanner, digital camera, etc. In another embodiment, the textual information could be in the form of data files, including an organization's secure or confidential information, stored in the memory of the computer. Such memory may include but is not limited to RAM, ROM, and/or any combination of volatile and non-volatile memory. In yet another embodiment, the information could be available in the form of a database in a computer's memory. In other embodiments, the information could be stored in a network server, or could be received from an external source via a network router.

The received information is converted to a normalized text format within the text normalization module 920. In one embodiment, this text normalization module is any computer implemented software application that can be used to convert the data file from a non-Unicode format to a Unicode text format. A person of skill in the art can immediately appreciate the wealth of third party software applications that are readily available to perform this normalization.

The received normalized information is then transmitted to a word detector 930. In one embodiment, the word detector could be a computer implemented software for running an algorithm to detect the boundaries of each word. In this embodiment, the word boundary detector uses a state machine and employs character-classes that dictate boundary analysis across languages. Here, the state machine utilizes mapping tables to determine what character-class a particular character belongs to. By mapping the current character and comparing that against the mapping of the previous character, the detector determines whether a word has just started or ended. Because the character-classes include generic word separators or delimiters common to most languages, this word boundary detector can be used in a language independent manner. Thus, various embodiments of this system can be developed for different languages. Additionally, a case-folding operation may be done on the words to remove any distinction between words containing upper case and lower case characters. This ensures that duplicate fingerprints are not generated for upper and lower case formats of the same word. Note that the case folding can be done at any time prior to the operation of the word hash list generation module.

The received normalized information is then used to generate a word hash list using the word hash list generation module 940. In one embodiment, this word hash list generation module is a computer implemented software that operates on every word of the received normalized textual information. In this embodiment, the module further comprises a computer implemented software to compute a hash function over all the characters of each word, resulting in a word-value hash for every word. These word-value hashes are compiled together in a list, and this list is designated as the word hash list. The word hash list can further be post-processed to exclude some word-value hashes in order to generate fingerprints that are robust and remain impervious to edits in derivative works of the original text. Examples of this include removing certain stop words that occur frequently in a language and grouping certain categories of words and mapping them to one common word-value hash. These post-processing steps can also be achieved by means of a computer implemented software.

The word hash list is finally used to generate a set of fingerprints by operation of the fingerprint generation module 950. In one embodiment, the fingerprint generation module is a computer implemented software capable of performing arithmetic and logic operations. Here, the software reads word-value hashes using a sliding window of size W, reading W number of word-value hashes at a given time. At each window instant, the software designates a distinct-valued word-value hash as an anchor, and generates a new fingerprint every time the anchor of the current window is not identical to the anchor from the immediately preceding window. The software computes the fingerprint by computing a new hash function over all word-value hashes starting from the first word-value hash of the current window up until the word-value hash corresponding to the anchor of the current window. This method of fingerprinting using wordruns is advantageous over other methods because it results in memory and resource efficiency, by reducing the total number of fingerprints that need to be stored in a fingerprint database.

FIG. 10 depicts an embodiment where the fingerprints generated using the system explained in FIG. 9 can be stored in a repository. Here, a receiver 101-, identical to the receiver 910 explained in FIG. 9, can be used to receive textual information. Examples of such information include an organization's confidential, secure, or any other important information that needs to be protected from unauthorized disclosure. The fingerprints for this information are generated using the word run based fingerprint generation module 1020, which uses the steps described in the fingerprint generation system explained in FIG. 9. The resulting fingerprints are stored in a repository 1030 for later use. Examples of a repository include recording the fingerprints in a database, a network server, a local computer, or any other magnetic or optical storage media.

FIG. 10 provides another embodiment where the fingerprints generated using the system of FIG. 9 can be used to be matched and inspected against a repository 1030 of fingerprints. In one embodiment, the system receives textual information entered into a computer by a user 1050, wherein the information may be entered in using one of several input devices. Examples of such input devices include keyboards, microphones, scanners, pointing devices (e.g., mouse), etc. The fingerprint generating module 1060 generates fingerprints for this information using the fingerprint generation system explained in FIG. 9. The inspection module 1070 then accepts the resulting fingerprints, which are then compared against the bank of fingerprints stored in the repository 1030. In one embodiment, a computer implemented software can be used to build the inspection module, wherein the software code enables the module to match the current fingerprint with a fingerprint in the repository 1030 and report any successful matches.

The systems explained in FIGS. 9-11 and all its embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A computer implemented method for preventing unauthorized disclosure of secure information, the computer implemented method comprising:
   receiving information including a first text, by a computer system having at least a processor for executing instructions, said first text including a plurality of words;
   normalizing, by said computer system, said first text into a first canonical text expression, said first canonical text expression including a plurality of normalized words;
   generating, at said computer system, a first word hash list for said first canonical text expression, where said first word hash list is generated at a word level;
   generating, at said computer system, a first set of fingerprints for said first word hash list;
   wherein generating said first word hash list includes converting said plurality of normalized words into a plurality of word-value hashes, each specific one of said word-value hashes representing a specific normalized word; and
   wherein said generating said first set of fingerprints includes:
      assigning a sliding window of size W, wherein said sliding window is used for reading a W number of said word-value hashes from said first word hash list;
      using said sliding window to read said W number of said word-level hashes from said first word hash list;
      designating said word-value hash with a distinct value within said sliding window as an anchor; and
      generating a fingerprint using a fingerprint hash function, wherein said fingerprint hash function is applied over all said word-value hashes contained within a start of said sliding window to where said anchor resides in said sliding window.

2. A computer implemented method for preventing unauthorized disclosure of secure information as recited in claim 1, wherein each of said plurality of words are defined as a combination of one or more text characters not separated by a specific predefined character, and each of said plurality of words are separated from a previous word and a subsequent word by at least one of said specific predefined character.

3. A computer implemented method for preventing unauthorized disclosure of secure information as recited in claim 2, wherein said specific predefined character is a space.

4. A computer implemented method for preventing unauthorized disclosure of secure information as recited in claim 2, wherein said specific predefined character is a punctuation character.

5. A computer implemented method for preventing unauthorized disclosure of secure information as recited in claim 2, wherein said specific predefined character includes one or more character types including a space, a period, a comma, a semi-colon, a colon, an exclamation point, a dash, a parenthesis, and a quote.

6. A computer implemented method for preventing unauthorized disclosure of secure information as recited in claim 1, wherein said plurality of words includes detecting separation of a specific word from a following or preceding word using a word boundary detector.

7. A computer implemented method for preventing unauthorized disclosure of secure information as recited in claim 6, wherein said word boundary detector is language independent.

8. A computer implemented method for preventing unauthorized disclosure of secure information as recited in claim 1, wherein said receiving information includes receiving secure information from a local database.

9. A computer implemented method for preventing unauthorized disclosure of secure information as recited in claim 1, wherein said normalizing said first text into a first canonical text expression includes converting said first text into Unicode.

10. A computer implemented method for preventing unauthorized disclosure of secure information as recited in claim 9, wherein said Unicode is Unicode Transformation Format 16 ("UTF16").

11. A computer implemented method for preventing unauthorized disclosure of secure information as recited in claim 1, wherein said first text is case-folded before generating said first word hash list, such that a specific word-value hash assigned to a specific normalized word does not depend upon whether the characters in said specific normalized word are upper case or lower case characters.

12. A computer implemented method for preventing unauthorized disclosure of secure information as recited in claim 1, wherein said first word hash list includes representing said word-value hash as an integer.

13. A computer implemented method for preventing unauthorized disclosure of secure information as recited in claim 12, wherein said integer includes a 32-bit unsigned integer.

14. A computer implemented method for preventing unauthorized disclosure of secure information as recited in claim 1, wherein converting said plurality of normalized words into said plurality of word-value hashes includes applying a hash function over all characters of each normalized word.

15. A computer implemented method for preventing unauthorized disclosure of secure information as recited in claim 1, where an ordering of said plurality of word-value hashes in said word hash list corresponds to an original ordering of said plurality of normalized words.

16. A computer implemented method for preventing unauthorized disclosure of secure information as recited in claim 1, wherein said converting said plurality of normalized words includes excluding word-value hashes for each of said plurality of normalized words which are stop words.

17. A computer implemented method for preventing unauthorized disclosure of secure information as recited in claim 16, wherein said stop words include a predefined set of words that occur frequently and do not add substantive content.

18. A computer implemented method for preventing unauthorized disclosure of secure information as recited in claim 1, wherein said converting said plurality of normalized words includes mapping a predefined set of common words to a unique word-value hash.

19. A computer implemented method for preventing unauthorized disclosure of secure information as recited in claim 1, wherein said converting said plurality of normalized words includes mapping a predefined set of synonyms to a unique word-value hash.

20. A computer implemented method for preventing unauthorized disclosure of secure information as recited in claim 1, wherein said converting said plurality of normalized words includes mapping a predefined set of words in a particular category to a unique word-value hash.

21. A computer implemented method for preventing unauthorized disclosure of secure information as recited in claim 1, wherein said generating said first set of fingerprints further comprises:
    moving said sliding window one said word-value hash to the right at a time within said first word hash list;
    reading said W number of said word-value hashes from said sliding window at said time;
    designating a second word-value hash with a new distinct value within said sliding window as a new anchor at said time; and
    generating a new fingerprint at said time using said fingerprint hash function, wherein said new fingerprint is generated only when said new anchor from said sliding window at said time is not identical to said anchor from said sliding window at the immediately previous said time.

22. A computer implemented method for preventing unauthorized disclosure of secure information as recited in claim 1, wherein said fingerprint hash function includes any hash function that allows said fingerprint to be independent of the order of said words in said first word hash list.

23. A computer implemented method for preventing unauthorized disclosure of secure information as recited in claim 22, wherein said fingerprint hash function includes a symmetric hash function.

24. A computer implemented method for preventing unauthorized disclosure of secure information as recited in claim 23, wherein said symmetric hash function uses an addition hash function.

25. A computer implemented method for preventing unauthorized disclosure of secure information as recited in claim 23, wherein said symmetric hash function uses a multiplication hash function.

26. A computer implemented method for preventing unauthorized disclosure of secure information as recited in claim 23, wherein said symmetric hash function uses an exclusive-or hash function.

27. A computer implemented method for preventing unauthorized disclosure of secure information as recited in claim 21, wherein said first set of fingerprints are recorded in a fingerprint database.

28. A computer implemented method for preventing unauthorized disclosure of secure information as recited in claim 27, wherein said fingerprint database serves as a repository for said first set of fingerprints generated for all said secure information.

29. A computer implemented method for preventing unauthorized disclosure of secure information as recited in claim 27, wherein said first set of fingerprints are matched against any repository that maintains a database of said first set of fingerprints that were previously generated for all said secure information.

30. A computer implemented method for preventing unauthorized disclosure of secure information as recited in claim 1, wherein said first set of fingerprints are impervious to derivative works of said first text.

31. A computer implemented method for preventing unauthorized disclosure of secure information as recited in claim 30, wherein said derivative work includes at least one of:
    change in the position at which a specific word of said plurality of words appears in said first text;
    change in the order in which said plurality of words appear in said first text;
    addition of one or more stop words to said first text;
    deletion of one or more stop words from said first text;
    addition of one or more punctuation marks to said first text;
    deletion of one or more punctuation marks from said first text;
    substitution of a specific word in said first text with a synonym of said specific word;
    substitution of a specific word in said first text with a hypernym of said specific word; or
    substitution of a specific word in said first text with a different word, wherein said different word has the same stem as said specific word.

* * * * *